(No Model.)

M. C. NILES.
DISK HARROW.

No. 328,054. Patented Oct. 13, 1885.

Witnesses.
W. C. Corlies
A. M. Best.

Inventor
Milton C Niles
By Coburn & Thacher
Attorneys

UNITED STATES PATENT OFFICE.

MILTON C. NILES, OF OAK PARK, ILLINOIS.

DISK-HARROW.

SPECIFICATION forming part of Letters Patent No. 328,054, dated October 13, 1885.

Application filed April 7, 1884. Serial No. 126,970. (No model.)

*To all whom it may concern:*

Figure 1:
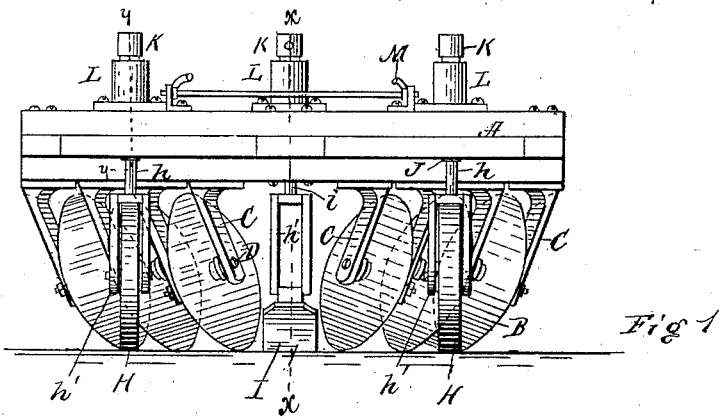
Figure 2:
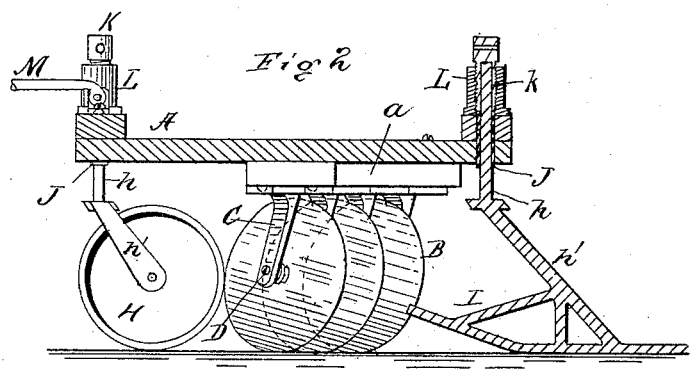
Figure 3:
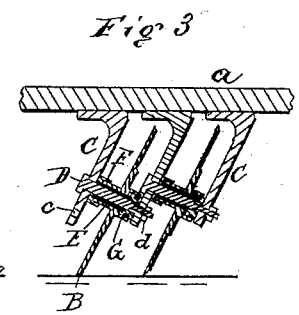
Figures 4, 5, 6, 7, 8:
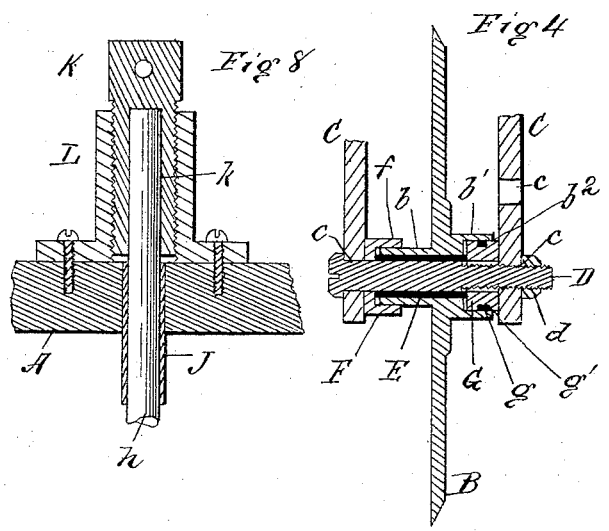

Be it known that I, MILTON C. NILES, a citizen of the United States, and residing at Oak Park, in the county of Cook and State of Illinois, have invented certain new and useful Improvements in Disk-Harrows, which are fully set forth in the following specification, reference being had to the accompanying drawings, in which—
Figure 1 represents a front elevation of an implement embracing my improvements; Fig. 2, a section of the same, taken on the line $xx$, Fig. 1; Fig. 3, a detail section showing two of the disks, the section being taken longitudinally through their axes; Fig. 4, a detail section of a single disk and its bearings on an enlarged scale; Fig. 5, a section of the cup-washer detached; Fig. 6, a similar section of the thimble for the disk-bearing; Fig. 7, a similar view of the packing collar or washer; and Fig. 8, a detail section of the raising and lowering device, taken on the line $xx$, Fig. 1.

In the drawings, Figs. 1, 2, and 3 are on the same scale, and Figs. 4, 5, 6, 7, and 8 are on the same scale, but considerably enlarged from that of the first-named figures.

My invention relates to that class of implements in which the ground is broken up by rotating disks, and my present improvements relate especially to implements of this kind in which a double inclination is given to the disks, so as to turn the soil on which they act and to more readily enter the ground, as set forth in Letters Patent heretofore granted to me, No. 269,096, dated December 12, 1882.

In the present instance the object of my invention is to provide an implement in which the disks are stationary—that is, have no adjustment on the frame to which they are attached—and in which they are all of the same size, means being provided for supporting and adjusting the frame according to the work required of the disks.

I will proceed to describe in detail the construction and operation of an implement embodying my present invention, as carried out practically in one way, and will then point out definitely in the claims the special improvements which I believe to be new and wish to protect by Letters Patent.

In the drawings, A represents the support-
ing-frame of the implement, which may be substantially rectangular in form. On the under side of this frame are secured two bars, $a$, their forward ends being attached to the frame near its middle, and the said bars diverging rearward and outward, forming a horizontal V with its apex toward the front of the machine, their outer end being attached to the side bars of the frame A, and the angle between them corresponding to that which it is desired to give to the series of disks relatively to each other on each side of the implement. The disks B are all of the same size, and are ordinarily straight-faced disks, being beveled at the edge to make them cut into the ground more readily. They are provided with hubs extending on each side, the projection $b$ on one side being perfectly straight, while that $b'$ on the other side is larger than the former and is cut out more at the outer end, so as to provide an enlarged cup-opening, $b^2$. Bracket-hangers C are attached to the under side of the bars $a$, so as to depend therefrom, as shown in Fig. 1 of the drawings. The depending portion of these brackets is set at an inclination inward, so that they will stand about parallel with the plane it is desired to give to each disk in its inclination to the surface of the ground, as shown in Fig. 3 of the drawings. These hangers are provided with openings $c$ at their lower ends, for the reception of journal pins or bolts D, which are passed through the hangers, one for each pair, and are held in place by a nut, $d$, turned on one end, or in any other suitable manner. One disk is mounted on each of these pins, with devices intended to produce a dust-proof bearing, which I will proceed to describe. A thimble or sleeve, E, is placed on the journal-pin, being fitted to the smaller portion of the interior of the hub. This thimble is made a little longer than this portion of the disk-hub, so as to project a little beyond the same at each end, as shown in Fig. 4 of the drawings.

A cup-washer, F, is placed on the journal-pin just inside of the hanger, next to the small portion $b$ of the disk-hub, which is received within this washer, the flange $f$ of which projects over the end of the hub considerably and is fitted to it as closely as practicable. At the other end a washer, G, is placed on the journal-pin just inside of the hanger, and is fitted to the cup in the large end, b', of the hub. This washer is provided with a packing, g, of some suitable material, which is placed in an annular groove, g', around the washer. These parts are all arranged as shown in Fig. 4 of the drawings, and it will be seen that the thimble is held between the two washers, and being a little longer than the hub between the washers there will be no binding of the hub, but it will be free to turn between the washers. It will also be noticed that the cup portion of the hub does not extend out quite to to the hanger, and thus provision is made to prevent friction from its bearing against the hanger, and also for readily adjusting the packing-washer to take up wear, or for any other purpose. It will be noticed, however, that when the disks are mounted in their inclined working position, as shown in Fig. 3 of the drawings, the protecting flanges on both sides of the disk incline downward and so dirt will fall off from them, while if they were arranged the other way they would facilitate the entrance of dirt underneath them. These devices substantially protect the journals of the disks from dirt, which is very important in this class of implements, as the disks are surrounded with dust and dirt and their bearings are readily cut away unless protected.

It is obvious from the description above that the axes of the disk have the double inclination set forth in my prior patent referred to above—that is, they are inclined to the line of draft and also to the plane of the surface over which they are drawn; hence the same result of turning the earth which is cut up by them will be secured, as described in the aforesaid patent.

The adjustment of the disks to cut into the earth and to a greater or less depth I propose to obtain by a vertical adjustment of the supporting-frame. This may be accomplished in any suitable way. I have, however, shown in the drawings a mode of doing this which is cheap and convenient. The frame is supported by two caster-wheels, H, at the forward end, and a broad shoe, I, at the rear end. These caster-wheels are carried by stems or posts h, having forks h' at their lower ends, in which the caster-wheels are journaled, and the shoe I is also carried by a similar post or stem, i. These posts project up through the frame, sleeves J being preferably provided for their bearing therein, as shown in Figs. 2 and 8 of the drawings. Their upper ends above the frame are received by plug-bolts K, which are provided with sockets k for the posts and also with an exterior thread. Tubular seats L are attached to the upper side of the frame, and are adapted to receive these screw-plugs, being threaded internally, so that the latter may be turned into them up and down. Of course the weight of the frame will carry the posts to the extremity of the sockets in which they are placed, and obviously the adjustment of the socket-plugs in their seats will adjust the frame up and down. This adjustment may be effected by a lever, a crank, or any other device suitable for turning the socket-plugs. It will also be seen that the caster-wheels and shoe are free to turn in their sockets, thus accommodating change of direction. I prefer the shoe to a caster-wheel at the rear of the frame, as it can readily be made much wider than is practical for the wheel, and so will not cut into the soft ground which has been turned up behind the disks, thereby lessening the draft.

A draft-pole or any other draft device may be attached to the forward end of the frame by means of hounds M, or any other way that will provide for the drawing forward of the implement.

I do not wish to be understood as limiting my invention to the particular devices or the particular construction and arrangement of these devices which I have set forth in the above description. There are many changes in details of construction and arrangement which may be made without losing the main features of the implement which I have devised. The disk may be differently arranged, differently hung, with different bearings and different devices for protecting the bearings, and the frame may be supported in a different manner and provided with different devices for effecting its vertical adjustment. The implement may also be made without provision for vertical adjustment. In manufacturing the implement for general use a great many such mechanical changes may be made; and I wish to be understood distinctly as contemplating such changes, so long as the main general idea of the implement is retained.

I am aware that independent disks arranged in two diverging series are not new, the same being shown in Letters Patent No. 127,677, granted to Erastus C. Bussell, June 11, 1872. I am also aware that two series of oppositely-inclined disks are not new, the same being shown in Letters Patent No. 243,705, granted to Thomas E. Jefferson, July 5, 1881. I am also aware of Letters Patent No. 124,585, granted to Moses Johnson, March 12, 1872, which shows two diverging series of oppositely-inclined disks; but the said disks are mounted on axes which are arranged at right angles to the plane of the series to which they belong, whereas in my construction the several axes on which the disks are mounted are arranged in the plane of the series, and, consequently, in the same plane. The former construction is well adapted for the purpose to which it is applied in the said patent, since by reason of this arrangement of the several axes the wheels or disks revolve readily upon a slight contact with the soil to perform their function of shifting-wheels; but is not so well adapted for use in a harrow, in which the disks are not intended to revolve so readily or upon such slight contact as is the construction hereinbefore set forth, in which the axes of the disks are arranged in the plane of the series.

Having thus described my invention, what I claim as new, and desire to secure by Letters Patent, is—

1. The supporting-frame, in combination with two series of revolving disks mounted on permanent journals, which in each series are arranged in the same vertical plane inclined to the line of draft, and which are independently inclined to the surface of the ground, the inclination of each series being opposed to that of the other, and adjustable frame-supports, whereby the frame may be raised and lowered bodily, substantially as and for the purposes set forth.

2. The disks B, provided with hubs $b$ $b'$, in combination with the journal-pins D, the sleeves E, the cup-washers F, and the packing-washers G, substantially as and for the purposes set forth.

3. The supporting-frame, in combination with the disks attached thereto, the caster-wheels, threaded plug-bolts having sockets for the posts of the caster-wheels, and the threaded seats for the bolts, substantially as and for the purposes set forth.

4. In a disk-harrow, a supporting-frame, in combination with two series of disks, the said series diverging in opposite directions, the disks composing each series being inclined to the line of draft and to the surface of the soil, the two inclinations of each series of disks being opposed to those of the other, and each disk of each series being mounted upon an independent axis, the axes of each series being arranged in the line of the plane of said series, substantially as and for the purposes specified.

MILTON C. NILES.

Witnesses.
JNO. R. GALL,
THOMAS H. PEASE.